(12) United States Patent
Sack

(10) Patent No.: US 7,137,609 B2
(45) Date of Patent: Nov. 21, 2006

(54) PULLING IRON POCKET, LID AND SHIELD

(75) Inventor: James A. Sack, Elverson, PA (US)

(73) Assignee: Pennsylvania Insert Corp., Spring City, PA (US)

( * ) Notice: Subject to any disclaimer, the term of this patent is extended or adjusted under 35 U.S.C. 154(b) by 340 days.

(21) Appl. No.: 10/754,856

(22) Filed: Jan. 9, 2004

(65) Prior Publication Data

US 2004/0140603 A1 Jul. 22, 2004

Related U.S. Application Data

(60) Provisional application No. 60/439,014, filed on Jan. 9, 2003.

(51) Int. Cl.
*E04G 13/02* (2006.01)
*E04G 9/10* (2006.01)

(52) U.S. Cl. .............. 249/91; 249/184; 52/125.5; 52/125.4; 52/125.2; 52/704; 52/98

(58) Field of Classification Search ............... 52/125.5, 52/125.2, 125.4, 124.2, 701, 704, 706, 707, 52/122.1, 682, 683, 98, 125.3; 294/89; 249/91, 249/184, 83, 61; 94/1.1
See application file for complete search history.

(56) References Cited

U.S. PATENT DOCUMENTS

| | | | | |
|---|---|---|---|---|
| 2,350,767 A | * | 6/1944 | Keating ................... | 52/166 |
| 3,123,885 A | * | 3/1964 | Marler .................... | 249/139 |
| 3,298,148 A | * | 1/1967 | Dickson .................. | 52/309.7 |
| 3,429,607 A | * | 2/1969 | White ..................... | 294/89 |
| 3,916,590 A | * | 11/1975 | Miller ..................... | 52/124.2 |
| 4,443,980 A | | 4/1984 | Pennypacker | |
| 4,580,378 A | * | 4/1986 | Kelly et al. ............. | 52/125.5 |
| 4,807,843 A | * | 2/1989 | Courtois et al. .......... | 249/61 |
| 4,821,994 A | * | 4/1989 | Fricker ................... | 249/91 |
| 5,155,954 A | * | 10/1992 | Roire ..................... | 52/125.5 |
| 5,226,265 A | * | 7/1993 | Kelly et al. ............. | 52/125.6 |
| 6,460,824 B1 | * | 10/2002 | Lancelot et al. ......... | 249/91 |
| 6,550,834 B1 | * | 4/2003 | Fromelius ................ | 294/89 |
| 6,688,049 B1 | | 2/2004 | Sanftleben et al. | |
| 2002/0062604 A1 | * | 5/2002 | Fromelius ................ | 52/125.5 |
| 2003/0140575 A1 | * | 7/2003 | Sanftleben et al. ...... | 52/125.4 |
| 2003/0140576 A1 | * | 7/2003 | Sanftleben .............. | 52/125.4 |

FOREIGN PATENT DOCUMENTS

| | | | | |
|---|---|---|---|---|
| EP | 568934 | * | 11/1993 | ................ 294/89 |
| WO | WO 94/08884 | * | 4/1994 | ................ 294/89 |

* cited by examiner

*Primary Examiner*—Phi Dieu Tran A
(74) *Attorney, Agent, or Firm*—Drinker Biddle & Reath LLP

(57) ABSTRACT

A pocket, lid and shield for casting a pulling iron in a concrete structure are described. The pocket includes a slot reinforced with stiffening members for receiving the pulling iron. The pocket also includes a frangible support post for supporting the pulling iron when it is received in the pocket. Also described are embodiments of a shield, which include clipping members adapted to engage the stiffening members, for covering the slot, and a lid having a lip for engaging a peripheral groove in the pocket. Methods of over-molding a pulling iron cable are also described. According to the methods, a temporary seal, which can be used in over-molding a subsequent pulling iron cable, can be formed simultaneously with each over-molded product. During molding, the cable can be held in the center of a channel in the mold tool using a retractable magnetic pin.

7 Claims, 11 Drawing Sheets

PULLING IRON POCKET, LID AND SHIELD

CROSS-REFERENCE TO RELATED APPLICATION

The present application claims priority from U.S. Provisional Application No. 60/439,014, filed Jan. 9, 2003, which is incorporated herein by reference in its entirety.

FIELD OF THE INVENTION

The invention relates to pre-formed inserts for use while pouring concrete and the like. More specifically, the invention relates to a pocket, lid and shield for recessing a pulling iron in a concrete structure.

BACKGROUND OF THE INVENTION

Pulling irons can be embedded in concrete structures to provide a hook by which a crane or other moving device can grab and manipulate the structure. In the field, the pulling iron can also be used to attach a pulley for pulling cables or wires through a conduit into the structure using a winch. Such pulling irons can be confined to a recess formed in the concrete so as not to protrude past the wall of the structure.

A pulling iron pocket is used to form the recess in the concrete structure. A known pulling iron pocket is shown in commonly owned U.S. Pat. No. 4,443,980, which is incorporated herein by reference. A pulling iron is partially embedded in the concrete and projects through a slot in the pocket into the recess at the time the structure is poured. The conventional pulling iron pocket has a flat seal area for engaging a lid. It has been found that the flat seal area may not always provide a completely leakproof seal; and can allow some concrete slurry to seep into the pocket. Also, the slot through which the pulling iron is inserted into the pocket may not be adequately rigid to resist deformation under pressure, potentially permitting further leakage.

In use, after inserting the pulling iron through the slot, a user must support the pulling iron by measuring and cutting pieces of Styrofoam or the like and placing the pieces between the pulling iron hook area and the inside body of the pocket. Unfortunately, even when supported by Styrofoam or the like, the possibility of the pulling iron moving about inside the pocket is not eliminated. Thus, the pulling iron can become embedded too close to the inside edge of the recess, providing an inadequate clearance area for attaching a hook to the pulling iron.

To help support the pulling iron in the pocket and to reduce leakage of concrete slurry through the slot, a shield can be integrally formed with over-molding around the pulling iron, as shown in commonly owned U.S. Pat. No. 3,916,590 and the above referenced '980 patent. The integral shield rests against the slot in use. Although this innovation improved the situation, the pulling iron could still move about inside the pocket during pouring and some leakage through the slot continued to be noted. Another attempt to overcome the problem involves a snap system of small round bumps intended to attach an integral pulling iron shield to the slot. In addition, it has been attempted to add a neoprene gasket around the slot. However, these systems may not hold the iron in place well because the snaps are small, difficult to use and may not latch tightly. Adding neoprene is costly and does not eliminate leakage of concrete into the pocket if excessive deformation occurs around the slot.

SUMMARY OF THE INVENTION

The invention relates to a pulling iron pocket for recessing a pulling iron in a concrete structure. The pulling iron includes a shell with an inside that defines an open cavity. The bottom of the shell has a substantially rectangular slot for receiving the pulling iron, and is reinforced with stiffening members on at least two sides of the slot. The pulling iron pocket can also include a support post that extends from the inside of the shell into the cavity for supporting a pulling iron when it is received in the slot.

The invention also relates to a system for recessing a pulling iron in a concrete structure. In addition to the pulling iron pocket, the system can include a shield and a lid. The shield is adapted to cover the slot and support the pulling iron when it is received in the slot. The shield includes a substantially flat plate for covering the slot and at least two clipping members for inserting through the slot and engaging the stiffening members. Each clipping member includes a post that extends upwardly from the plate and a gripping finger that extends transversely therefrom. The system can further include a lid to close the pocket. The periphery of the lid can include a lip to engage a groove in the periphery of the pocket shell.

The invention also relates to a method of over-molding a pulling iron cable. The method can involve molding one or more temporary sealing rings and applying the temporary sealing rings onto the pulling iron cable to be molded. The molding tool can be closed to crush the temporary sealing rings between the pulling iron cable and the mold tool to substantially form a seal between the inside of the tool and outside the tool. The tool can be configured so that injecting plastic into the tool simultaneously forms a coating on the pulling iron cable and one or more additional temporary sealing rings, which can be used to form seals when over-molding the next pulling iron cable. The pulling iron cable can be held in the center of a channel in the tool using a magnetic pin that initially extends into the channel, but automatically retracts when pressure within the tool reaches a pre-selected level.

BRIEF DESCRIPTION OF THE DRAWINGS

For the purpose of illustrating the invention, there are shown in the drawings forms which are presently preferred; it being understood, that this invention is not limited to the precise arrangements and instrumentalities shown.

DESCRIPTION OF THE PREFERRED EMBODIMENTS

Figure 1:
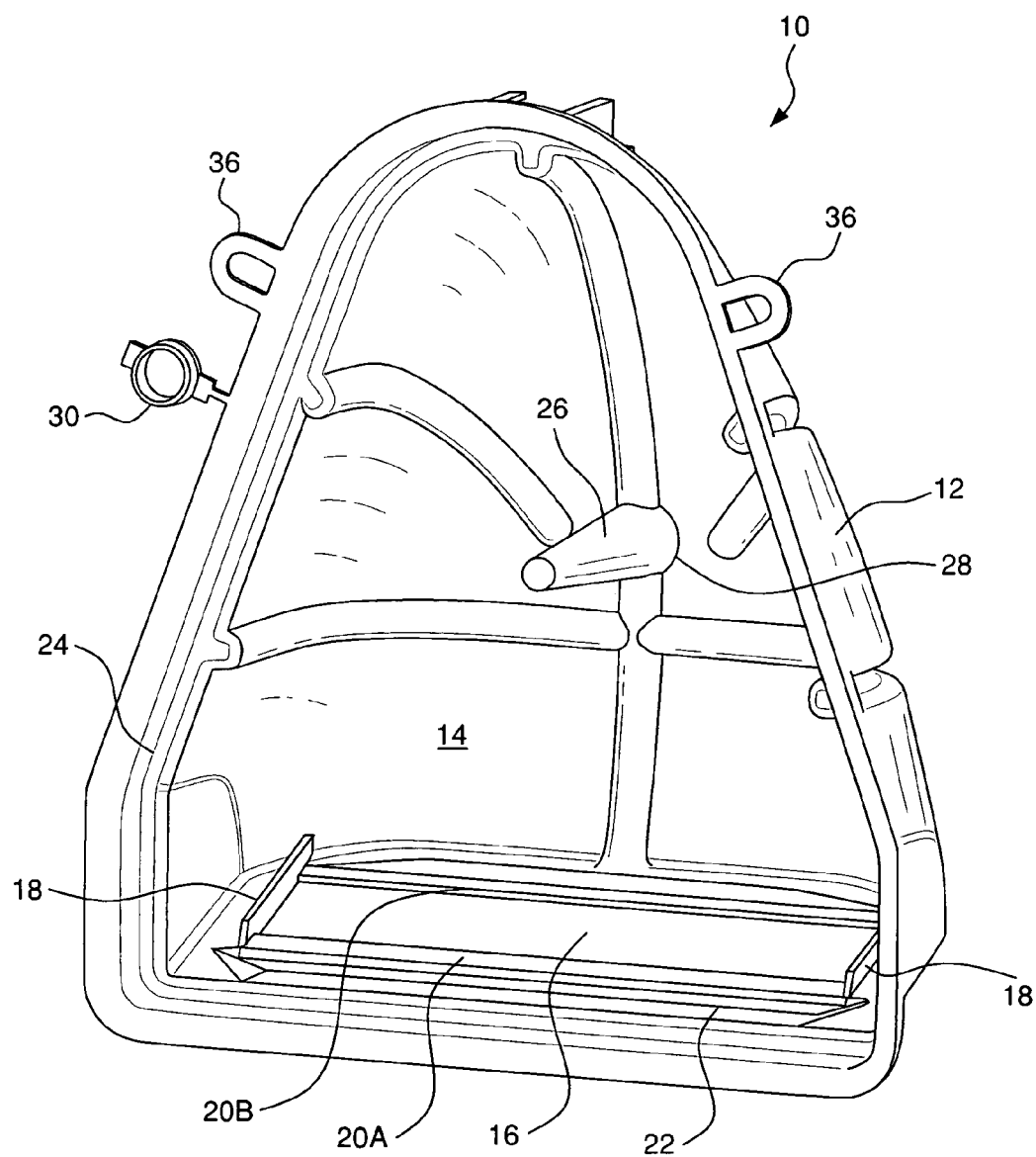
FIG. 1 is a view of the inside of a pulling iron pocket according to an embodiment of the present invention.

In the Figures, in which like reference numerals indicate like elements, there are shown a preferred pulling iron pocket, a lid and shields according to the present invention. FIG. 1 shows the inside of a pulling iron pocket 10. The pocket 10 includes a shell 12 having an inside 14 that defines a cavity. The shell is preferably plastic.

The bottom of the shell includes a slot 16 that is reinforced with stiffening members on at least two sides, preferably on all sides. The stiffening members can include lateral walls 18, forward rim 20A and rear rim 20B. In addition, the bottom of the pocket can be provided with a recess 22 adjacent the forward rim 20A to provide additional resistance to bending. A similar feature can be provided adjacent the rear rim 20B. Together, the stiffening members provide a substantially rigid surface surrounding the slot 16.

A groove 24 may be formed around the periphery of the front of the pocket 10. The groove 24 provides a robust snap in detail to create a tight, secure seal between the pocket 10 and a lid. Because the lid can be snapped into place, magnets can be used to secure the pocket and lid assembly to a steel form. The groove 24 and magnet receiving features will be described further below with reference to FIG. 5.

A support post 26 extends from the back of the inside of the pocket 10 into the cavity. The support post 26 can provide support for a pulling iron when inserted into the cavity through the slot 16, thereby reducing or eliminating movement of the pulling iron while inside the cavity. The support post 26 can be formed with an area of weakness at its base 28, where the support post 26 can be easily snapped off after the concrete wall has been formed and cured, so that the post 26 does not interfere with hooking capabilities. The pocket 10 can also be formed integrally with a frangible cap 30. The cap 30 can be shaped to fit on the end of the support post 26 to act as an extender of the post if desired.

Figure 2:
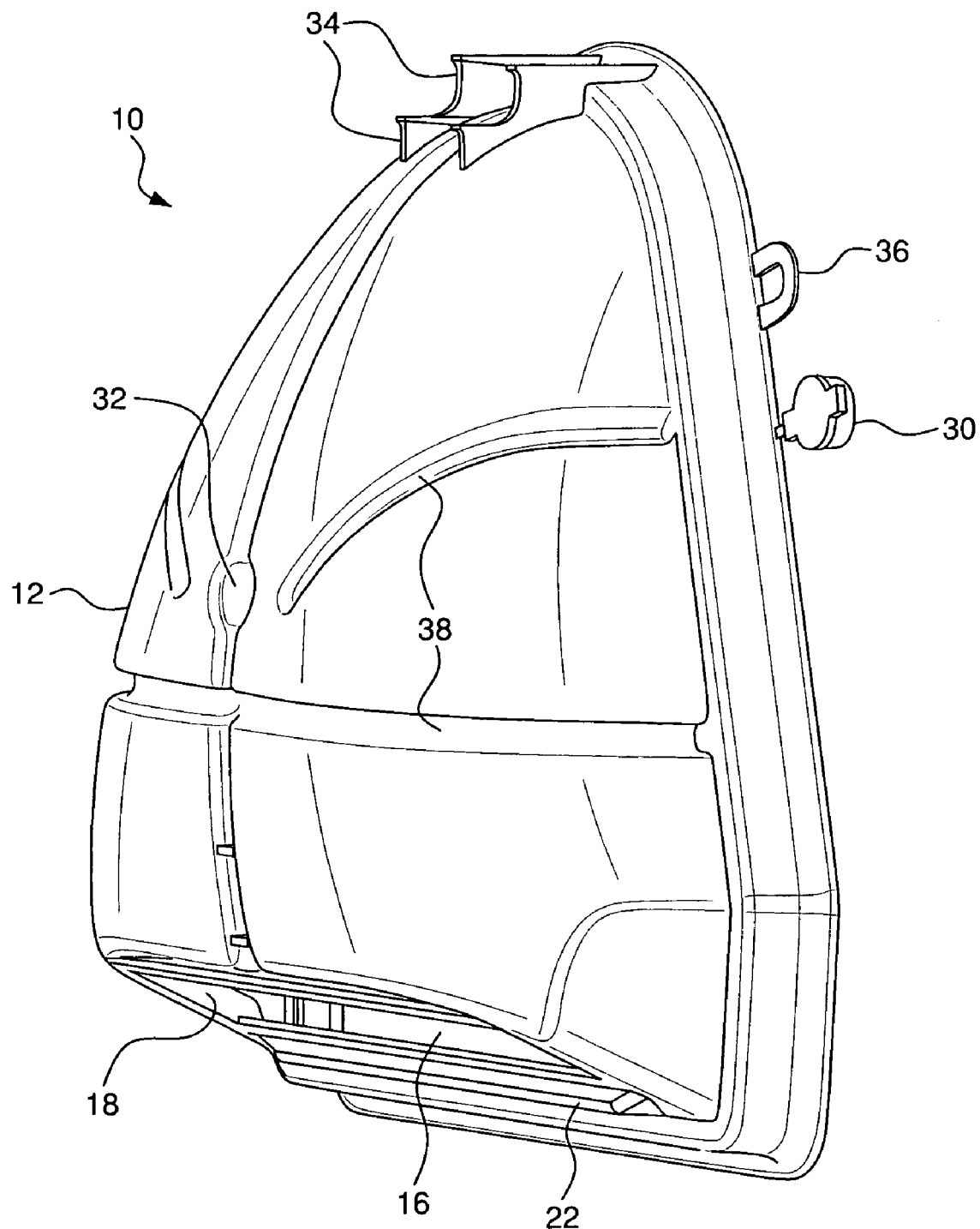
FIG. 2 is a view of the outside of the pulling iron pocket of FIG. 1.

As shown in FIG. 2, formation of the support post 26 can leave an opening 32 near the middle of the outside of the shell 12. The cap 30 can be sized to fit into and fill the opening 32. Thus, if the cap 30 is not used as a post extender, the cap can seal opening 32 so that concrete does not fill the post 26 when the concrete is poured.

Multiple rebar saddles 34 at standard concrete coverage height are incorporated on the outside shell of the pocket to facilitate the attachment of the pocket 10 to a rebar cage. The rebar can rest on the saddles 34, thereby allowing a user to conveniently tie or otherwise attach the pocket to the rebar or form at the proper height. To facilitate attachment of the pocket, attachment loops 36 can be included on the shell 12. A user can utilize the attachment loops 36 to conveniently wire or tie the pocket 10 to the rebar cage or screw the pocket 10 to a wooden form.

Grooves 38 can also be provided in the pocket 10 for engaging rebar. Several of the features described above, including the slot 16 and recess 22 (which is a protrusion from the outside), can also be seen from outside the shell in FIG. 2.

Figure 3:
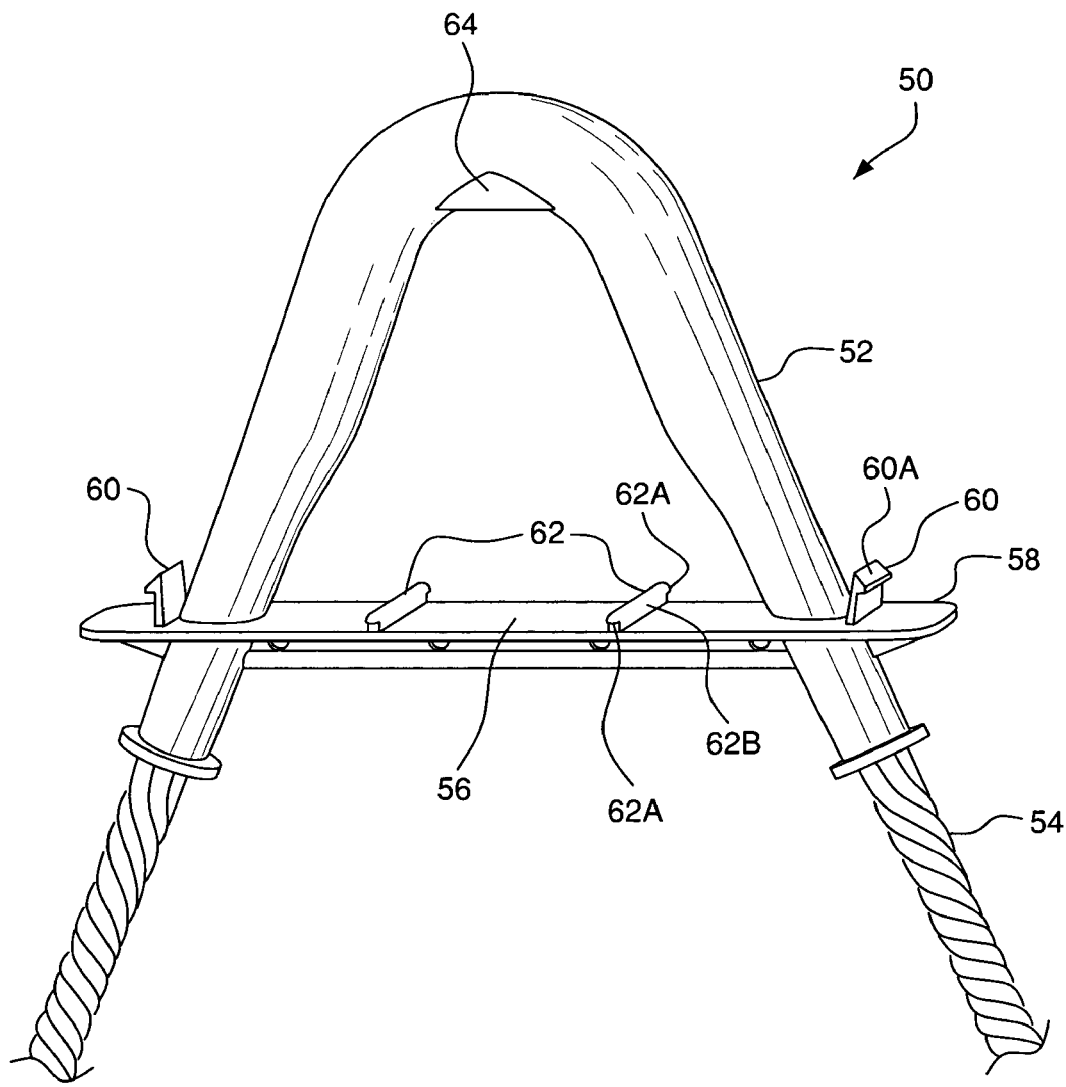
FIG. 3 is a view of an over-molded pulling iron according to an embodiment of the present invention.

An over-molded pulling iron 50 is shown in FIG. 3. Insulation 52 is injection molded around the pulling iron cable 54. The insulation 52 is a material that will provide corrosion resistance to the wound metal cables making up the pulling iron. Preferably, the insulation 52 also has relatively high resistance to the flow of electricity, such as plastic or rubber. The insulation 52 can be formed with an integral shield 56 so that a distinct shield is not needed. The integral shield 56 is formed of one-piece construction with the insulation 52 during injection molding. The integral shield includes a substantially flat, rectangular plate 58 that is dimensioned to be longer and wider than the slot 16 in the shell 12.

A set of clipping members extend upwardly from the top of the plate 58. The clipping members can include lateral clips 60 spaced apart so as to engage the lateral walls 18 of the pocket 10. The lateral clips 60 can be resiliently flexible and can each include an angled upper surface 60A on a gripping finger that extends transversely from an upwardly extending post. The angled upper surfaces 60A engage the sides of the slot 16 and can bias the lateral clips 60 inwardly when a user pushes the clips 60 upwardly through the slot. Once inserted through the slot 16, the lateral clips 60 can resiliently flex outwardly so that the gripping fingers engage the lateral walls 18, in which position the clips 60 tend to stay in place.

The clipping members can further include inner clips 62 having gripping fingers 62A extending transversely (forward and rear) of an upwardly extending post 62B. The shield 56 can be tilted forward or rearward to facilitate insertion of the inner clips 62 through the slot 16. The gripping fingers can engage the forward and rear rims 20 adjacent the slot 16 once a user pushes the inner clips 62 upwardly through the slot, in which position the inner clips 62 tend to stay in place.

The clipping members are sized to correspond with the stiffening members surrounding the pocket slot 16. Thus, once the shield 56 is snapped into place, the clipping members tend to hold the plate 56 flush against the bottom of the shell, sealing the slot 16, and tend to hold the pulling iron 50 stationary within the pocket. To further help support the pulling iron 50, the insulation 52 can be formed with post-engagement surfaces 64 sloping rearwardly (in the front) and forwardly (in the back) for engaging the support post 26. The engagement of the post-engagement surface 64 and support post 26, as well as the that of the clipping members with the stiffening members around the slot, will be further described below with regard to FIGS. 5 and 6.

Figure 4A:
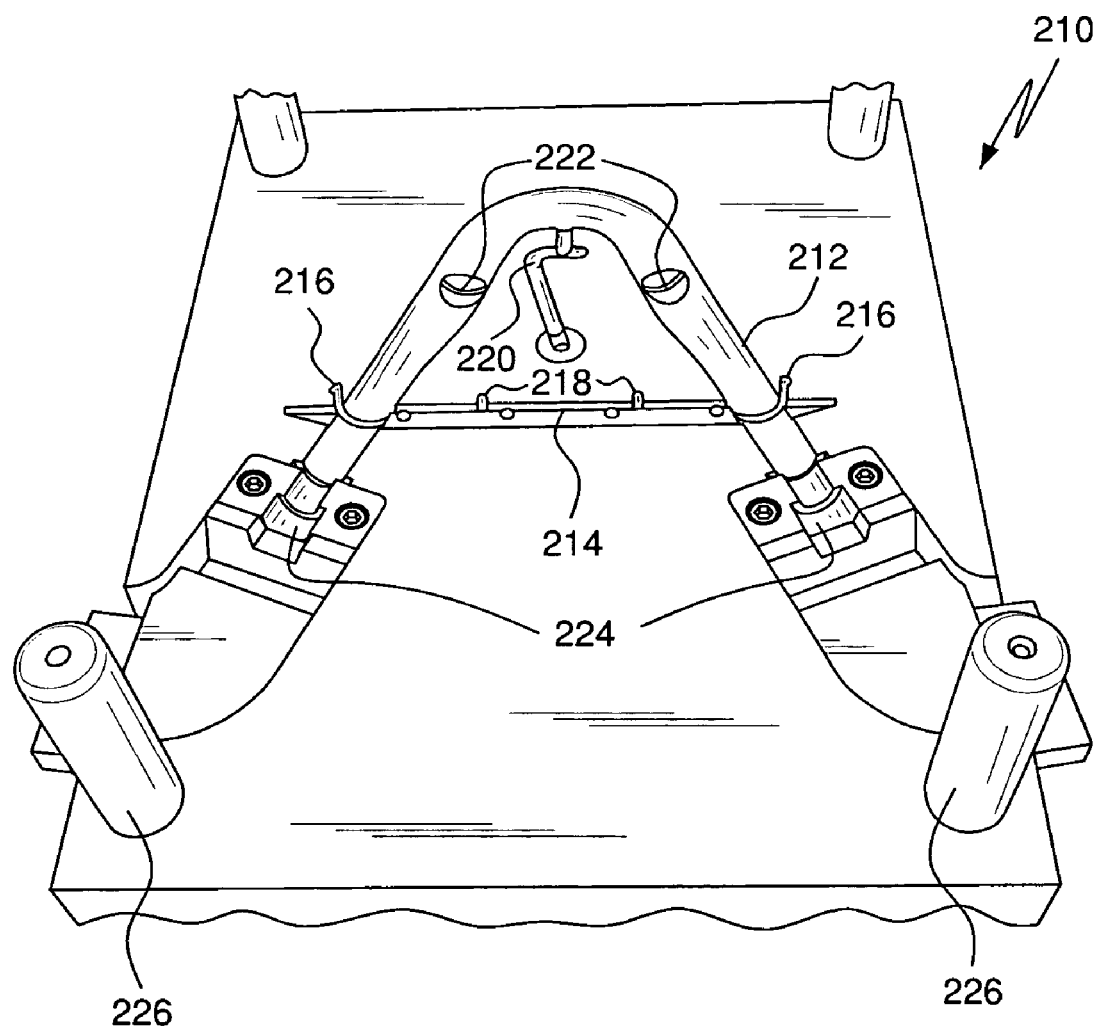
FIG. 4A is a plan view of the injection side of a tool for over-molding a pulling iron.
Figure 4B:
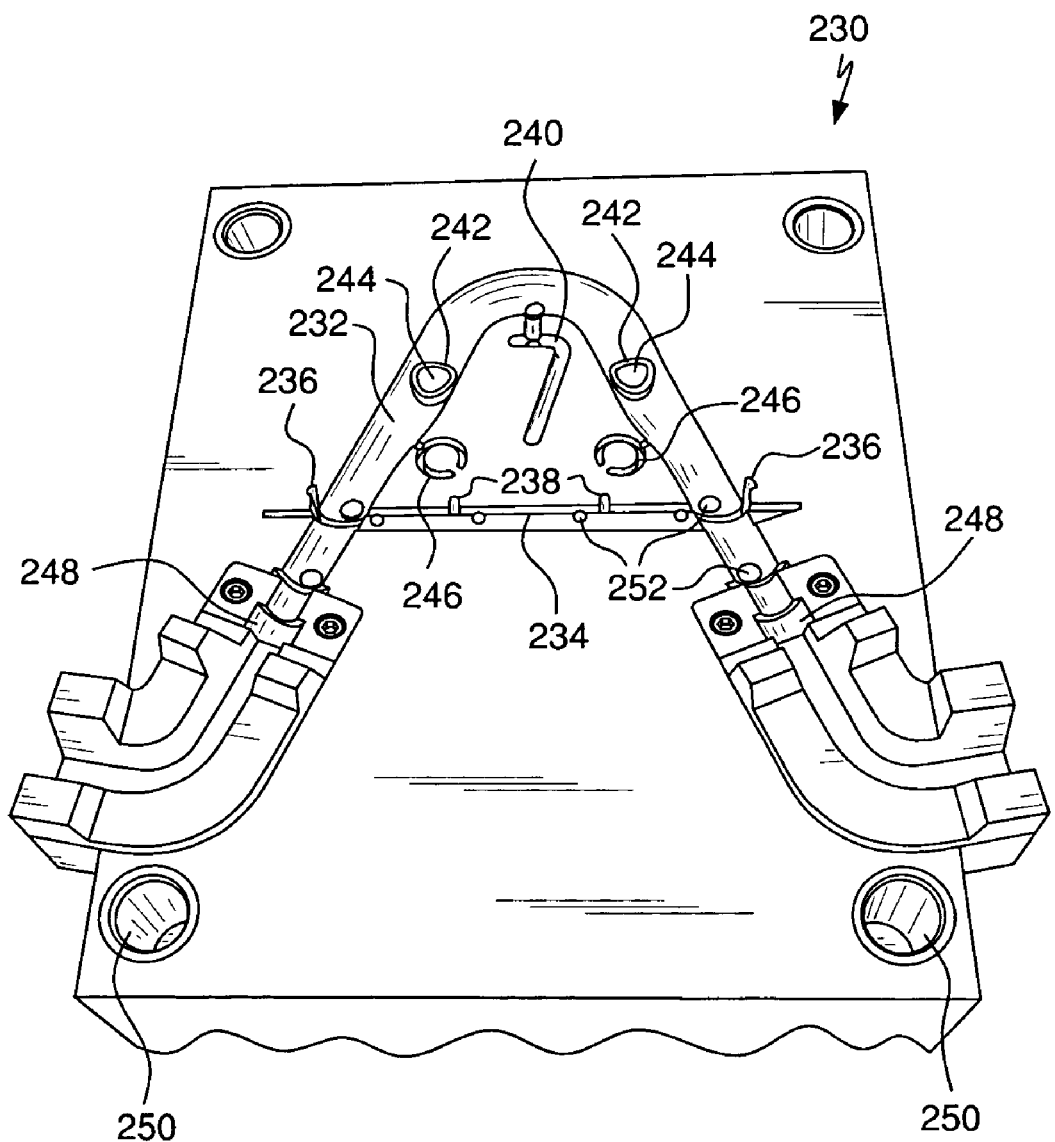
FIG. 4B is a plan view of the ejection side of a tool for over-molding a pulling iron.

FIGS. 4A and 4B show the injection side 210 and ejection side 230, respectively, of a molding tool that can be used to mold the insulation and integral shield around the pulling iron cable 54. The injection side 210 of the tool includes a channel 212 for receiving the pulling iron cable to be molded. A trough 214 is provided in the tool for forming the plate 58. Appropriately shaped grooves 216, 218 are provided for forming, respectively, the lateral clips 60 and inner clips 62. An injection port 220 is connected to a source of pressurized molten thermoplastic for filling the mold. Disposed within the channel 212 are spring pins 222 that are biased into the channel 212 in the absence of molding pressure. At each end of the channel 212 is an expanded chamber 224 for forming a collar at the end of the insulation 52, and for receiving a molded seal. The expanded chamber 224 may be formed in a replaceable wear component that can be bolted to the rest of the tool side 210 and replaced once worn from repeated use. The corners of the injection side 210 include posts 226 for mating with the ejection side 230.

The ejection side 230 includes a channel 232 that corresponds with the channel 212 of the injection side 210 when the sides are mated. A trough 234 and grooves 236, 238 correspond, respectively with the trough 214 and grooves 216, 218. An injection channel 240 corresponds with the injection port 220. Magnetic spring pins 242 are disposed in the tool and are biased into the channel 232 when the mold is not pressurized. Each of the magnetic spring pins can be magnetized with a centrally disposed magnet 244 that can be raised above the periphery of the pins 242. A pair of C-shaped grooves 246 are connected to the channel 232 by a thin run. As explained further below, the C-shaped grooves 246 can be used to mold C-shaped temporary sealing rings for sealing the inside of the tool from the outside around the pulling iron cables during subsequent molding of the next part. The C-shaped seals can be closed to form annular seals that are sized slightly larger than the radius of an expanded chamber 248 in a replaceable wear component at the end of the channel 232. Adjacent the replaceable wear components are curved locating channels extending from the expanded chambers 248 to the edges of the tool. The locating channels serve to appropriately hold the pulling iron cable in place with respect to the plane of the tool face. That means that the locating channels hold the cable in the center of the channel 232 in the x and y directions (x and y being parallel with the tool face in which the various features of the cavity are disposed). The corners of the ejection side 230 include bores 250 for slideably receiving the posts 226 of the injection side 210 for mating the sides. Ejector pins 252 are provided at various locations about the side 230 for ejecting the part when molding is complete.

In use, a pulling iron cable is placed in the channel 232 of the ejection side of the tool. The bend in the cable (in the area of post-engagement surface 64 of the finished product) may be covered by a bent metal sleeve for additional reinforcement prior to placing it in the tool. The sides 210, 230 of the molding tool are mated under high force, 60,000 pounds for example, with the cable sandwiched in the combined corresponding channels 212, 232. With the tool sides 210, 230 clamped together, the pulling iron cable is maintained in the center of the combined channel 212, 232 in the z direction (normal to the x and y directions) by the magnetic spring pins 242 and spring pins 222. Because the magnetic spring pins tends to hold the pulling iron cable consistently in the middle of the combined channel, the final molded pulling iron has consistent depth of plastic around the pulling iron cable. The combined channel can be relatively narrow because no or only a minimal amount of extra plastic must be injected to ensure that all sides of the cable are covered with an acceptable thickness of plastic.

Molten thermoplastic can be injected under pressure through the injection port 220. A suitable injection pressure is 10,000 pounds per square inch. As the molten plastic is injected, the area around the pulling iron cable in the combined channel 212, 232 and the various features described above become filled. The magnetic spring pins 242 and spring pins 222 have pressure-sensitive surfaces that are not in contact with the pulling iron cable. When pressure within the tool reaches a pre-selected level, the pressure overcomes the biasing and magnetic forces and pushes the magnetic spring pins 242 and spring pins 222 into the tool. Thus, the magnetic spring pins 242 and spring pins 222 automatically retract from the channel 232 when the pre-selected pressure is reached. The pulling iron cable does not tend to move inside the cavity when the pins are retracted because plastic already surrounds the cable when retraction occurs. Once retracted, plastic flows into the areas previously occupied by the magnetic spring pins 242 and spring pins 222 to provide a substantially smooth, uninterrupted coating of plastic around the cable. Upon cooling, the ejector pins 252 can be actuated and an over-molded pulling iron, as described above, is formed.

During formation of the plastic coating around the pulling iron cable, two C-shaped ring seals are simultaneously formed in the grooves 246. The C-shaped ring seals are frangibly attached to the insulation around the pulling iron cable. The C-shaped seals can be removed from the over-molded pulling iron and snapped around the next cable to be over-molded. The C-shaped seals are positioned along the cable such that they rest in the expanded chambers 248 when the cable is placed in the ejector side of the tool. As the sides are clamped together, the C-shaped seals are crushed between the expanded chambers 224, 248. The force of the closing tool closes the C-shaped seals into annular seals and crushes the seals into the spaces between the individual strands of cable. The annular seals substantially prevent plastic injected into the tool from leaking out during the molding process at the points where the pulling iron cable enter the channel. Thus, high pressure can be achieved within the mold without losing significant amounts of plastic, thereby allowing the production of high quality parts.

It should be noted that C-shaped seals may not be available for the first part to be molded. Thus, the first over-molded pulling iron may not be produced under the desirable high pressure or without substantial leakage. Instead of inserting a pulling iron cable for the first molding run, the first run can be a "blank" run if desired. It is possible to inject plastic into the tool without a cable in place to form an all plastic molding. (A temporary seal can block the entry points of the cable into the channel if desired.) This will produce the desired C-shaped seals for the next molding run, without over-molding a cable under undesirable conditions.

Figure 5:
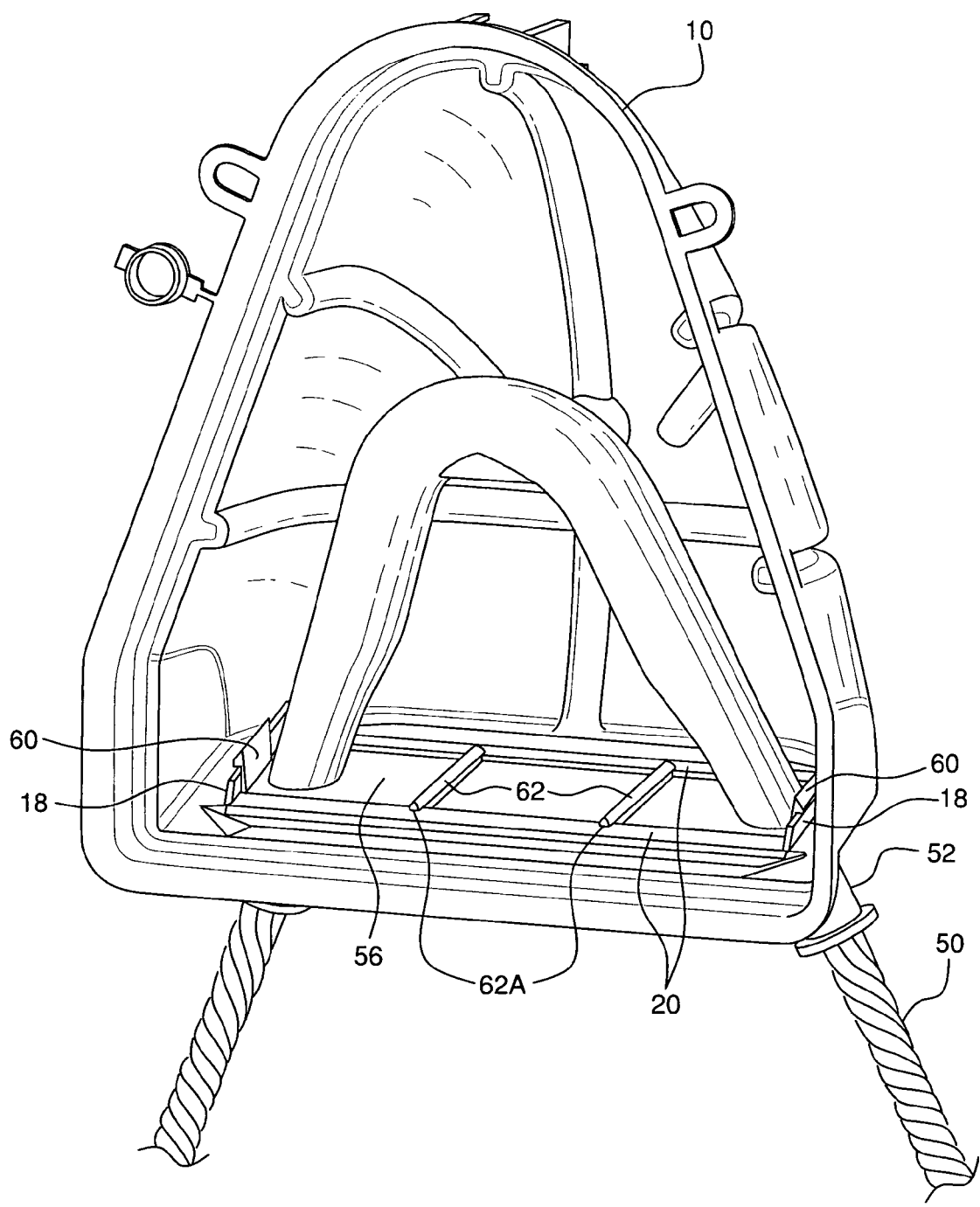
FIG. 5 is a view of the over-molded pulling iron of FIG. 2 engaged with the pulling iron pocket of FIG. 1.
Figure 6:
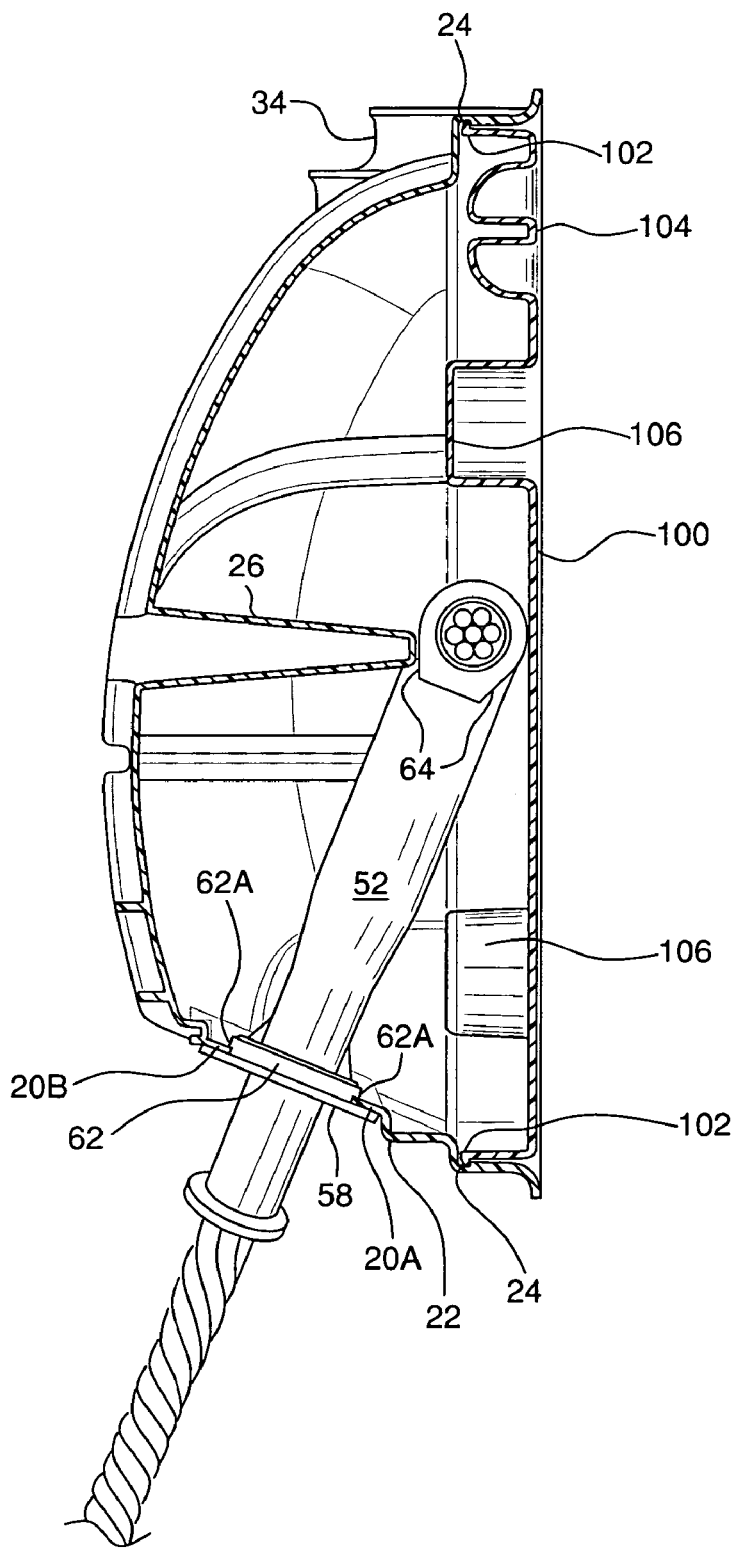
FIG. 6 is a cross-sectional view of the assembly of FIG. 5 with a lid in place.

FIG. 5 shows the over-molded pulling iron 50 engaged with the pocket 10, without a lid. FIG. 6 shows a lateral cross section of the engagement of FIG. 5 with a lid 100 snapped into place. The lid 100 can be a generally triangular shape as viewed from a major side (not shown) to correspond with the opening in the pocket 10. The groove 24, into which the lid 100 can be snapped, is best seen in FIG. 6. To facilitate the snapping engagement, the lid 100 can be formed with an outwardly extending lip 102 to snap into the groove 24. The groove 24 in the pocket 10 and the corresponding lip 102 preferably extend around the entire periphery of the pocket 10 and lid 100 respectively, or can alternatively be provided in discrete corresponding locations spaced about the peripheries.

The lid 100 can also be provided with features to facilitate locating, mounting, and/or subsequently removing the assembly. A gripping feature 104 can be incorporated into the face of the lid 100. The gripping feature 104 includes a recess in the lid 100 and a protrusion extending from the back of the recess back toward the major face. The protrusion enables a user to grip and remove the lid 100 with pliers or the like after the pocket has been used to form a recess in a structure.

Mounting features 106 can be incorporated into the lid to assist a user in locating and/or mounting the assembly. The mounting features 106 can be cells formed from round or other shaped walls extending from the face of the lid into the pocket. The mounting features 106 can be about one inch in diameter and extend into the pocket about ¾ of an inch. The cells can be open to the outside of the pocket for receiving magnets or tap-ons. If metal forms are used, one inch magnets, for example, may be friction fit into the cells to hold the lid (and pocket, by virtue of the snapped engagement of lip 102 and groove 24) against the form. Alternatively, a one-inch diameter tap-on can be screwed or riveted to a wooden form. The mounting feature 106 can then be friction mounted onto the tap-on. The lid 100 can be provided with a plurality of mounting features 106. If three mounting features are used, they can be arranged in a triangle. The cross sectional view of FIG. 6 cuts through the upper mounting feature 106 of such an arrangement, while cutting in between the lower two mounting features 106.

Once the clipping members of the shield 56 are pushed upwardly through the slot 16, the shield plate 58 can be substantially in contact with the bottom of the pocket shell 12 to form a seal. The shield plate 58 is securely held in substantial contact with the bottom of the shell by the engagement of the lateral clips 60 against the lateral walls 18 (FIG. 5) and the gripping fingers 62A of the inner clips 62 against the rear and forward rims 20 (FIGS. 5 and 6). This robust snapping arrangement between the shield 56 with the reinforced edges of the slot 16 substantially prevents leakage of concrete into the pocket through the slot and significantly restricts the freedom of movement of the pulling iron 50 within the pocket.

Also as shown in FIG. 6, it should now be clear that the post-engagement surface 64 of the pulling iron insulation 52 is angled to provide a receiving surface for the support post 26. (A post-engagement surface can be provided on both sides of the insulation 52 so that the pulling iron 50 can be inserted into the pocket in either orientation.) The engagement of the support post 26 against the post-engagement surface 64 further limits the freedom of movement of the pulling iron within the pocket 10. If the pulling iron or insulation around the pulling iron is not as thick as that of pulling iron 50, or if a non-insulated pulling iron is used, the cap 30 can be placed on the end of the support post 26 to extend it. When the lid 100 is snapped into place, it can contact the opposite side of the pulling iron 50 or otherwise still further reduce or substantially eliminate its freedom of movement.

Figure 7:
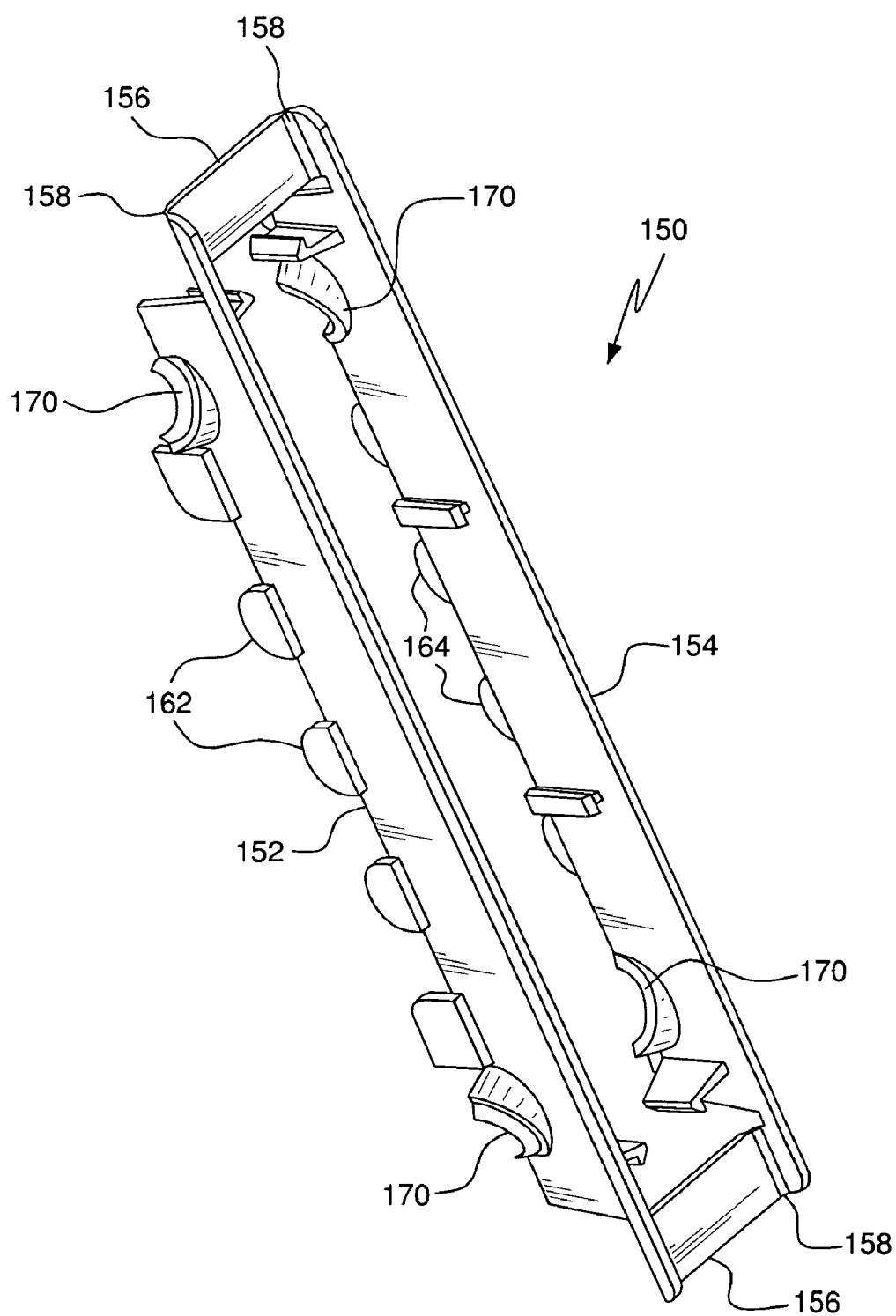
FIG. 7 shows an open foldable shield, according to an embodiment of the present invention, for a pulling iron without an integral shield.
Figure 8:
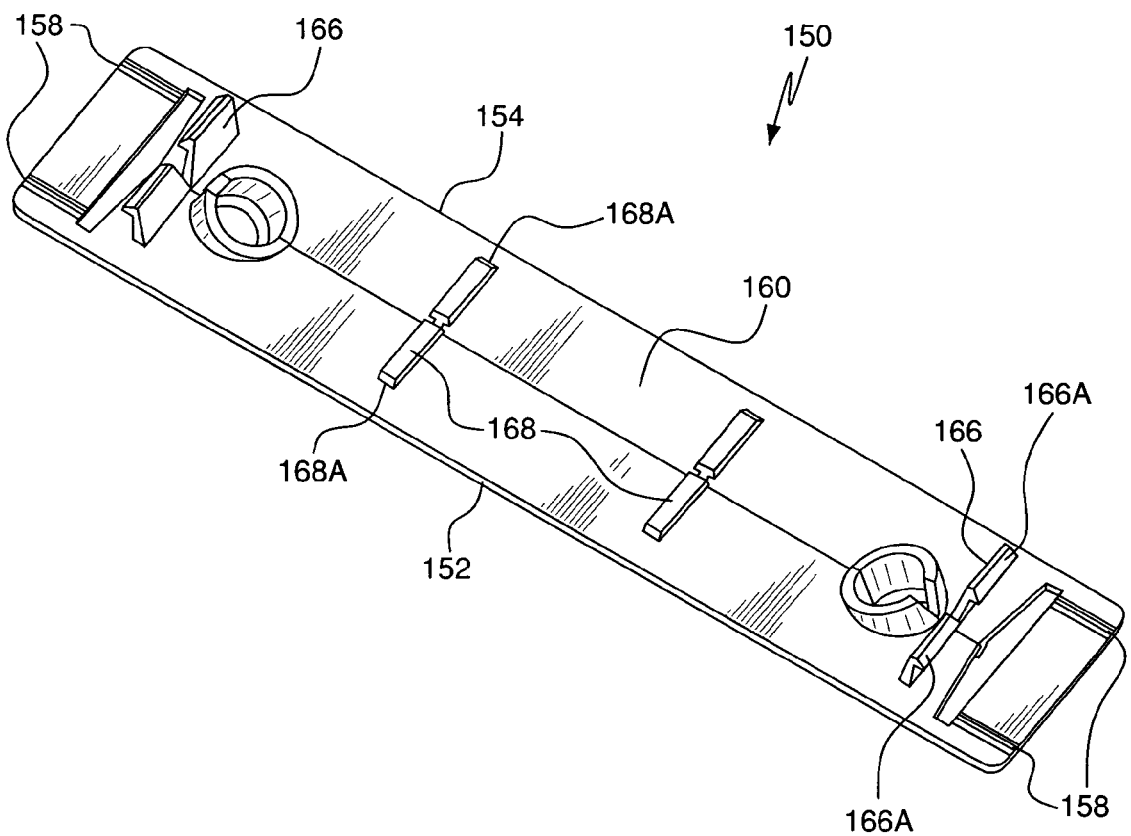
FIG. 8 is a top view of the shield of FIG. 7 after folding.
Figure 9:
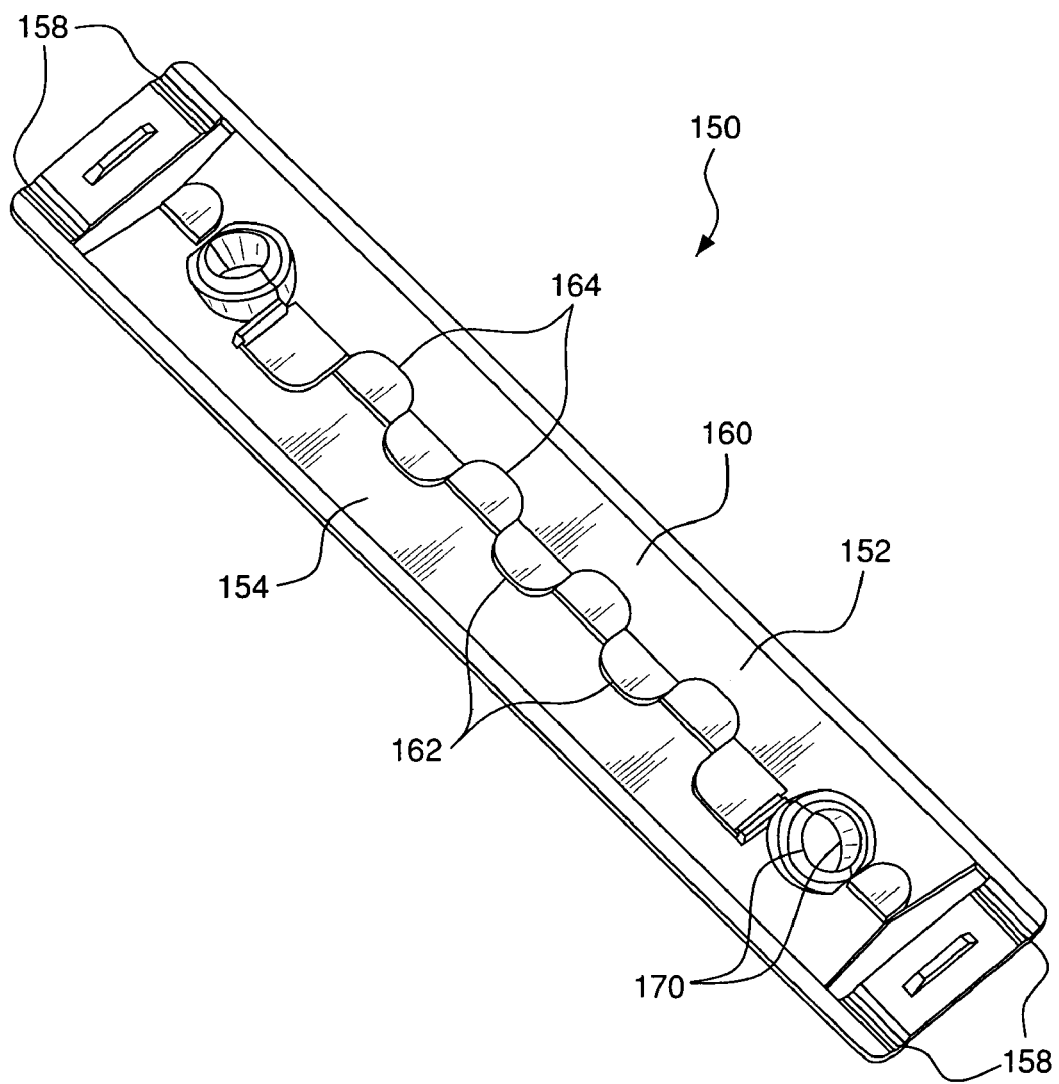
FIG. 9 is a bottom view of the shield of FIG. 7 after folding.

FIG. 7 shows a shield 150 for an unmolded pulling iron. As used herein, the term "unmolded pulling iron" refers to a pulling iron that does not have a shield integrally formed with over-molded insulation during the molding process. Such a pulling iron may have plastic molded around it, especially at the hooking area as shown in the drawing. The shield 150 allows an unmolded pulling iron to snap securely in place in the pulling iron pocket. The shield includes two shield flaps 152, 154 connected by a pair of bridges 156, preferably constructed as one piece. The shield flaps 152, 154 are foldable toward one another at hinges 158 to form a substantially flat plate 160 as shown in FIGS. 8 and 9. A set of engaging fingers 162, 164 is provided immediately below the plane of the flaps to prevent over-travel of the flaps 152, 154 and to help form a seal.

The top of the shield 150 features clipping members that are similar to those on the integral shield 56. The clipping members can include lateral clips 166 and inner clips 168. The lateral clips 166 are spaced apart so as to engage the lateral walls 18 of the pocket 10. The lateral clips 166 can be resiliently flexible and can each include angled upper surfaces 166A on gripping fingers that extend transversely from posts that extend upwardly from each of the flaps. The angled upper surfaces 166A engage the sides of the slot 16 and can bias the lateral clips 166 inwardly when a user pushes the clips 166 upwardly through the slot. Once inserted through the slot 16, the lateral clips can resiliently flex outwardly so that the gripping fingers engage the lateral walls 18, in which position the clips 166 tend to stay in place.

The inner clips 168 have gripping fingers 168A extending transversely (forward and rear) of posts that extend upwardly from each flap. The shield 150 can be tilted forward or rearward to facilitate insertion of the inner clips 168 through the slot 16. When inserted through the slot 16, the inner clips 168 can engage the forward and rearward reinforcing rims 20 of the pocket, in which position the inner clips 168 tend to stay in place.

Figure 10:
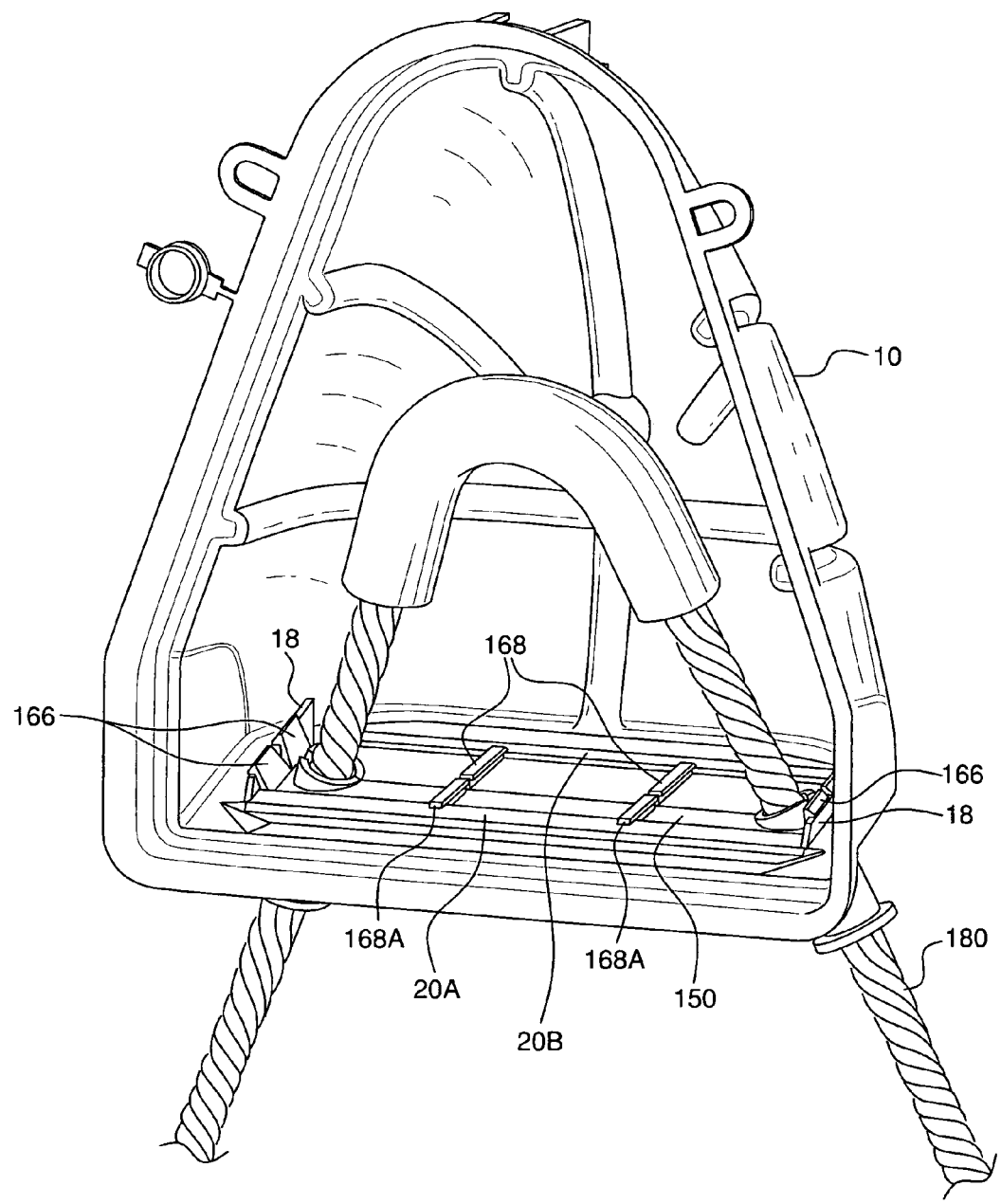
FIG. 10 shows the shield of FIG. 7, after folding, engaged with a pulling iron without an integral shield and the pulling iron pocket of FIG. 1.

The shield flaps 152, 154 each have semi-circular openings 170 angled to cooperate with each other for receiving the unmolded pulling iron cable. In use, the unfolded shield 150 (FIG. 7) can be slid over the hooking area of the pulling iron until the semi-circular openings align with the unmolded cables of the pulling iron. The shield flaps can then be folded about hinges 158 toward one another around the pulling iron. The shield 150 and unmolded pulling iron 180 can then be engaged with the pulling iron pocket 10 as shown in FIG. 10.

Like those of the integral shield 56, the clipping members of the shield 150 are sized to correspond with the stiffening members surrounding the pocket slot 16. Thus, once the shield 150 is snapped into place, the clipping members tend to hold the plate 160 snugly against the bottom of the pocket 10 and the pulling iron 180 stationary within the pocket. The folded flaps 152, 154, aided by engaging fingers 162, 164 substantially seal out concrete during the pouring process. The thin sealing detail around cooperating semi-circles 170 surrounding the pulling iron cable conforms closely to the cable, restricting concrete slurry leakage.

The robust snapping features of both the integral shield 56 and the distinct shield 150, in combination with the stiffening members around the slot 16 and the support post 26 of the pocket, provide excellent support for the pulling iron 50 or 180. Using the features described above, a builder can achieve very good and consistent results by embedding a pulling iron in concrete to form a recessed pulling iron in a structure.

A variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. In a concrete structure a pulling iron cable having an intermediate portion between opposite ends of the cable including a bend defining a hook area for receiving a lifting hook, the pulling iron pocket comprising:

a shell having a bottom, an inside and an outside, the inside defining an open cavity;

the bottom having a substantially rectangular slot for receiving the intermediate portion of the pulling iron cable, and stiffening members located at the slot on at least two sides of the slot;

an elongated support post extending substantially transversely of the slot from an inside surface of the shell into the cavity, the support post extending to a distance from the inside surface of the shell sufficient to contact the intermediate portion of the pulling iron cable adjacent an apex of the bend when the pulling iron cable is received in the slot to support the pulling iron cable to limit relative movement between the pulling iron cable and the shell during formation of the concrete structure;

the support post connected to the inside of the shell at a base, the support post comprising an area of weakness at the base adapted for separation of the support post from the shell following the formation of the concrete structure to facilitate placement of a lifting hook into the hook area of the pulling iron cable.

2. The pulling iron pocket of claim 1 further comprising a frangible cap molded with the shell, the frangible cap shaped and sized to fit on the end of the support post as a support post extender.

3. The pulling iron pocket of claim 2 wherein the frangible cap is shaped and sized to alternatively plug a hole in the outside of the shell where the support post was formed.

4. The pulling iron pocket of claim 1 further comprising a groove at the periphery of the shell for receiving a lip on a pocket lid.

5. The pulling iron pocket of claim 1 wherein the stiffening members comprise lateral walls extending upwardly from the bottom of the shell.

6. The pulling iron pocket of claim 5 wherein the stiffening members further comprise forward and rearward rims extending on opposite sides of the slot between the lateral walls.

7. The pulling iron pocket of claim 1 further comprising one or more rebar saddles on the outside of the shell.

* * * * *